(12) United States Patent
Errickson et al.

(10) Patent No.: US 8,225,280 B2
(45) Date of Patent: Jul. 17, 2012

(54) INCORPORATING STATE MACHINE CONTROLS INTO EXISTING NON-STATE MACHINE ENVIRONMENTS

(75) Inventors: Richard K. Errickson, Poughkeepsie, NY (US); Leonard W. Helmer, Jr., Stone Ridge, NY (US); John S. Houston, Hopewell Junction, NY (US); R. Timothy Tomaselli, Salt Point, NY (US); Ambrose A. Verdibello, Jr., Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 12/058,034

(22) Filed: Mar. 28, 2008

(65) Prior Publication Data
US 2009/0217238 A1 Aug. 27, 2009

Related U.S. Application Data

(60) Provisional application No. 61/031,315, filed on Feb. 25, 2008.

(51) Int. Cl.
*G06F 9/44* (2006.01)
(52) U.S. Cl. ........................................ 717/110
(58) Field of Classification Search ........................ None
See application file for complete search history.

(56) References Cited

U.S. PATENT DOCUMENTS

| | | | |
|---|---|---|---|
| 3,643,227 A | 2/1972 | Smith et al. | |
| 4,993,014 A | 2/1991 | Gordon | |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,524,212 A | 6/1996 | Somani et al. | |
| 5,764,641 A | 6/1998 | Lin | |
| 5,777,987 A | 7/1998 | Adams et al. | |
| 6,073,181 A | 6/2000 | Holland et al. | |
| 6,181,677 B1 | 1/2001 | Valli et al. | |
| 6,185,629 B1 * | 2/2001 | Simpson et al. | 710/10 |
| 6,289,386 B1 | 9/2001 | Vangemert | |
| 6,363,457 B1 | 3/2002 | Sundberg | |
| 6,483,804 B1 | 11/2002 | Muller et al. | |
| 6,507,567 B1 | 1/2003 | Willars | |
| 6,741,552 B1 | 5/2004 | McCrosky et al. | |
| 6,862,609 B2 | 3/2005 | Merkey | |

(Continued)

OTHER PUBLICATIONS

Non-Final Office Action dated Jun. 23, 2010 for U.S. Appl. No. 12/036,986.

(Continued)

*Primary Examiner* — Philip Wang
(74) *Attorney, Agent, or Firm* — Cantor Colburn LLP; Steven Chiu (57) ABSTRACT

A computer program product for incorporating state machine controls into existing non-state machine environments includes a tangible storage medium readable by a processing circuit and storing instructions for execution by the processing circuit for performing a method. The method includes determining a state machine representation for an existing environment, assigning state indicators to each state of the state machine, transcoding existing software flags of the environment into modifier values associated with the state indicators, assigning state values based on the modifier values and the state indicators, assigning event identifiers for transitions from the state values, and creating a tabular representation of the determined state machine, the tabular representation providing next state information based on the event identifiers and the state values.

17 Claims, 8 Drawing Sheets

U.S. PATENT DOCUMENTS

| | | | |
|---|---|---|---|
| 6,993,032 B1 | 1/2006 | Dammann et al. | |
| 7,093,024 B2 | 8/2006 | Craddock et al. | |
| 7,200,704 B2 | 4/2007 | Njoku et al. | |
| 7,283,473 B2 | 10/2007 | Arndt et al. | |
| 7,290,077 B2 | 10/2007 | Gregg et al. | |
| 7,366,813 B2 | 4/2008 | Gregg et al. | |
| 7,444,641 B1 * | 10/2008 | Diepstraten et al. | 718/107 |
| 7,467,402 B2 | 12/2008 | Pennington et al. | |
| 7,602,774 B1 | 10/2009 | Sundaresan et al. | |
| 7,613,183 B1 | 11/2009 | Brewer et al. | |
| 2001/0014954 A1 | 8/2001 | Purcell et al. | |
| 2001/0030943 A1 | 10/2001 | Gregg et al. | |
| 2002/0091826 A1 | 7/2002 | Comeau et al. | |
| 2002/0107903 A1 | 8/2002 | Richter et al. | |
| 2002/0194245 A1 | 12/2002 | Simpson et al. | |
| 2003/0005039 A1 | 1/2003 | Craddock et al. | |
| 2003/0018828 A1 | 1/2003 | Craddock et al. | |
| 2003/0061379 A1 | 3/2003 | Craddock et al. | |
| 2004/0123068 A1 | 6/2004 | Hashimoto | |
| 2004/0154007 A1 * | 8/2004 | Koizumi et al. | 717/151 |
| 2004/0202189 A1 | 10/2004 | Arndt et al. | |
| 2004/0221070 A1 | 11/2004 | Ortega, III et al. | |
| 2005/0018669 A1 | 1/2005 | Arndt et al. | |
| 2005/0060445 A1 | 3/2005 | Beukema et al. | |
| 2005/0080933 A1 * | 4/2005 | Herring | 709/249 |
| 2005/0120237 A1 | 6/2005 | Roux et al. | |
| 2005/0144313 A1 | 6/2005 | Arndt et al. | |
| 2006/0048214 A1 | 3/2006 | Pennington et al. | |
| 2006/0176167 A1 | 8/2006 | Dohrmann | |
| 2006/0230185 A1 | 10/2006 | Errickson et al. | |
| 2006/0230209 A1 | 10/2006 | Gregg et al. | |
| 2006/0230219 A1 | 10/2006 | Njoku et al. | |
| 2007/0239963 A1 | 10/2007 | Yao et al. | |
| 2007/0245050 A1 | 10/2007 | Gregg et al. | |
| 2008/0028116 A1 | 1/2008 | Gregg et al. | |
| 2008/0109891 A1 | 5/2008 | Greenwald et al. | |
| 2008/0196041 A1 | 8/2008 | Gregg et al. | |
| 2009/0019312 A1 | 1/2009 | Kulkarni et al. | |
| 2009/0094603 A1 | 4/2009 | Hiltgen et al. | |
| 2009/0217238 A1 * | 8/2009 | Errickson et al. | 717/110 |

OTHER PUBLICATIONS

Non-Final Office Action dated Jan. 29, 2010 for U.S. Appl. No. 12/036,979.
Notice of Allowance dated Jun. 23, 2010 for U.S. Appl. No. 12/036,979.
Non-Final Office Action dated Oct. 1, 2010 ffor U.S. Appl. No. 12/037,046.
Non-Final Office Action dated May 17, 2010 for U.S. Appl. No. 12/037,046.
Office Action made Final dated Oct. 6, 2010 for U.S. Appl. No. 12/037,048.
Non-Final Office Action dated Apr. 9, 2010 for U.S. Appl. No. 12/037,048.
Office Action Made Final dated Aug. 12, 2010 for U.S. Appl. No. 12/051,634.
Non-Final Office Action dated Mar. 22, 2010 for U.S. Appl. No. 12/051,634.
Non-Final Office Action dated May 13, 2010 for U.S. Appl. No. 12/051,631.
Non-Final Office Action dated Jun. 1, 2010 for U.S. Appl. No. 12/051,630.
Huang et al., InfiniBand Support in Xen Virtual Machine Environmant, Technical Report, OSU-CISRC-10/05-TR63, Oct. 2005.
"Infiniband Architecture Specification vol. 1", Release 1.0.a, Jun. 19, 2001, pp. 40, 71, 193-194, 366-370, 665-667.
Wu et al., "Design of an InfiniBand Emulator over Myrinet: Challenges, Implementation, and Performance Evaluation", Technical Report, OSU-CISRC-2/01-TR03, 2003.
Jeong et al.; A study on TCP Buffer Management Algorithim for Improvement on Network Performance in Grid Environment; 2004 pp. 281-288.
Non-Final Offica Action dated Mar. 22, 2011 for U.S. Appl. No. 12/036,983.
Advisory Action dated Feb. 16, 2011 for U.S. Appl. No. 12/036,986.
Office Action made Final dated Dec. 8, 2010 for U.S. Appl. No. 12/036,986.
Notice of Allowance dated Feb. 7, 2011 for U.S. Appl. No. 12/036,979.
Notice of Allowance dated Apr. 22, 2011 for U.S. Appl. No. 12/037,046.
Notice of Allowance dated Jan. 11, 2011 for U.S. Appl. No. 12/037,048.
Notice of Allowance dated Oct. 15, 2010 for U.S. Appl. No. 12/051,631.
Final Office dated Nov. 12, 2010 for U.S. Appl. No. 12/051,630.
Non Final Office Action dated Dec. 1, 2011 for U.S. Appl. No. 12/051,634.
Non Final Office Action dated Jan. 9, 2012 for U.S. Appl. No. 12/051,630.
Non Final Office Action dated Feb. 8, 2012 for U.S. Appl. No. 12/058,054.
Final Office Action dated Jan. 4, 2012 for U.S. Appl. No. 12/051,628.

* cited by examiner

INCORPORATING STATE MACHINE CONTROLS INTO EXISTING NON-STATE MACHINE ENVIRONMENTS

Priority based on U.S. Provisional Patent Application Ser. No. 61/031,315, filed Feb. 25, 2008, and entitled "MULTITASKING MULTI-PROCESSOR ENVIRONMENTS OVER INFINIBAND" is claimed, the entire contents of which is incorporated by reference in its entirety.

BACKGROUND OF THE INVENTION

1. Field of Invention

The present disclosure relates generally to state machines, and in particular, to incorporating state machine controls into existing non-state machine environments while reducing disruption to the existing environment.

2. Description of Background

InfiniBand® Architecture (IBA) is an industry standard architecture for connecting complex systems. Particularly, InfiniBand® (IB), which is a form of System Area Network (SAN), defines a multicast facility that allows a Channel Adapter (CA) to send a packet to a single address and have it delivered to multiple ports. The InfiniBand® Architecture is described in the InfiniBand® standard, which is available at http://www.infinibandta.org, and also hereby incorporated in its entirety by reference.

The transition of existing system software and firmware for use with IBA creates a number of challenges. For example, some older systems relied on specialized hardware for buffer handling and other communications related tasks. The specialized hardware may operate based on older coupling technologies, and may be well understood using existing system software and/or firmware. Furthermore, the existing code may also be well understood. However, the new transport technology offered with IBA makes it difficult to use software designed for specialized hardware to reliably control communications. Moreover, extensive modification and/or re-writing of existing software to facilitate new features is troublesome and time-consuming.

BRIEF SUMMARY OF THE INVENTION

An exemplary embodiment includes a computer program product for incorporating state machine controls into existing non-state machine environments. The computer program product includes a tangible storage medium readable by a processing circuit and storing instructions for execution by the processing circuit for performing a method. The method includes determining a state machine representation for an existing environment, assigning state indicators to each state of the state machine, transcoding existing software flags of the environment into modifier values to be associated with the state indicators, assigning state values based on the modifier values and the state indicators, assigning event identifiers for transitions from the state values, and creating a tabular representation of the determined state machine, the tabular representation providing next state information based on the event identifiers and the state values.

Another exemplary embodiment includes a multitasking multiprocessor environment. The environment includes a plurality of processors configured to execute portions of existing software and a method of incorporating state machine control into the existing software. The method includes determining a state machine representation for an existing environment, assigning state indicators to each state of the state machine, transcoding existing software flags of the environment into modifier values to be associated with the state indicators, assigning state values based on the modifier values and the state indicators, assigning event identifiers for transitions from the state values, and creating a tabular representation of the determined state machine, the tabular representation providing next state information based on the event identifiers and the state values.

A further exemplary embodiment includes a method for incorporating state machine controls into existing non-state machine environments. The method includes determining a state machine representation for an existing environment, assigning state indicators to each state of the state machine, transcoding existing software flags of the environment into modifier values to be associated with the state indicators, assigning state values based on the modifier values and the state indicators, assigning event identifiers for transitions from the state values, and creating a tabular representation of the determined state machine, the tabular representation providing next state information based on the event identifiers and the state values.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of this disclosure and the associated claims.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides a method incorporating state machine controls into existing non-state machine environments. Technical effects of example embodiments include the ability to effectively introduce definite state machine controls into existing systems with reduced impact to the existing code on the systems. Thus, transition to new designs while retaining well-understood existing code is made feasible. Furthermore, the example methodologies herein may be used for temporary functionality while new code is written at a more gradual pace, effectively reducing strain on resources which may have been exhausted in re-writing existing software to support newer functionality.

Figure 1A:
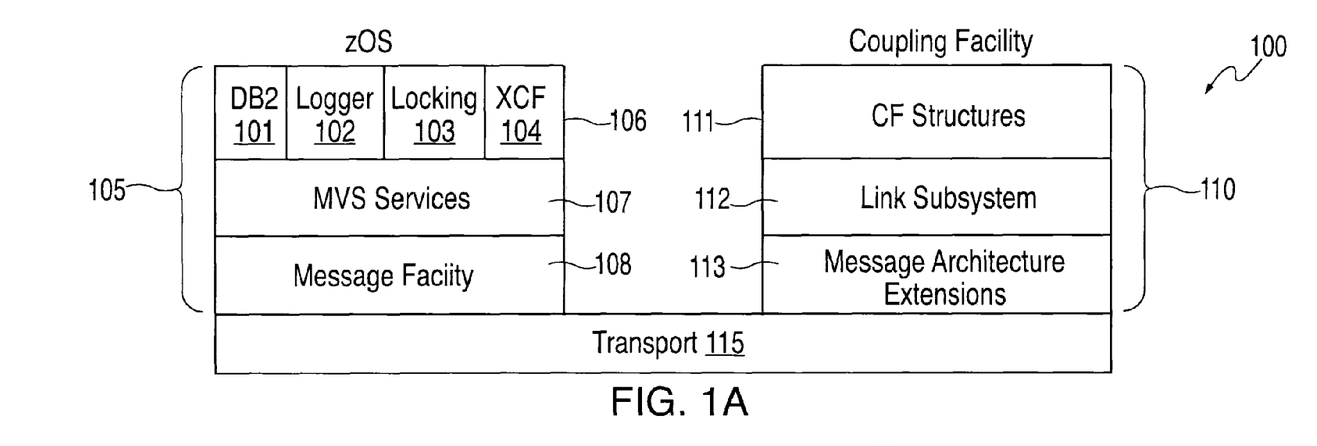
FIG. 1A illustrates an example embodiment of a multitasking multiprocessor Infiniband® system.
Figure 1B:
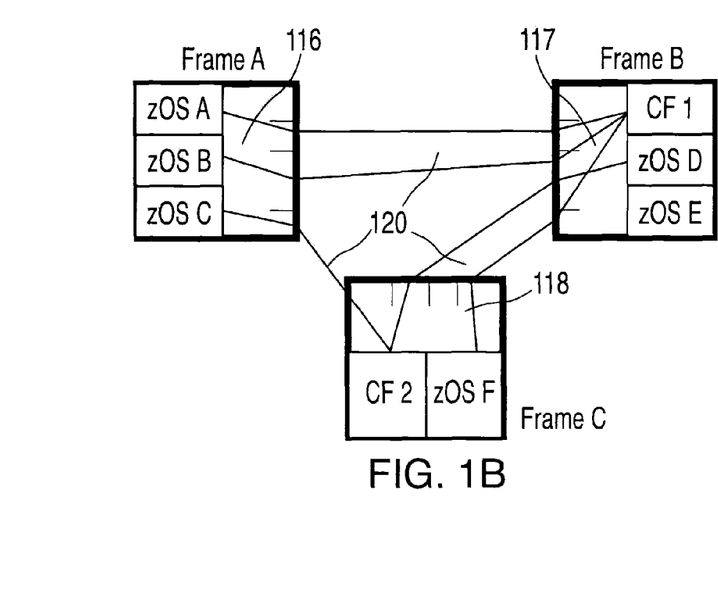
FIG. 1B illustrates an example of a multitasking multiprocessor environment.
Figure 1C:
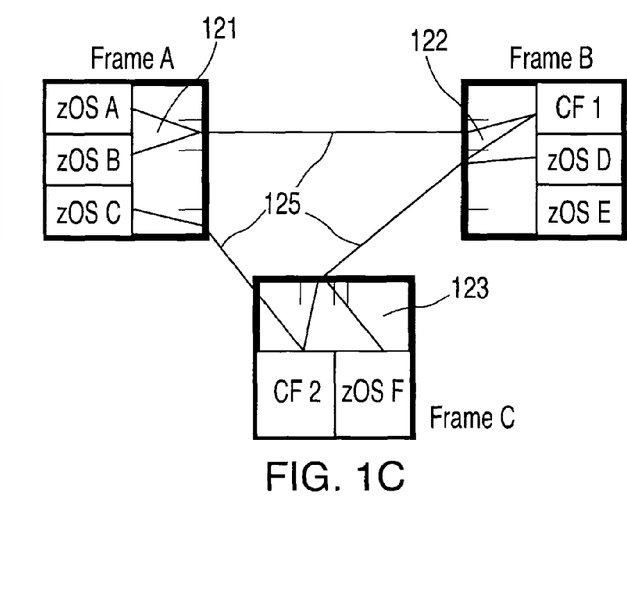
FIG. 1C illustrates a multitasking multiprocessor environment, according to an example embodiment.
Figure 1D:
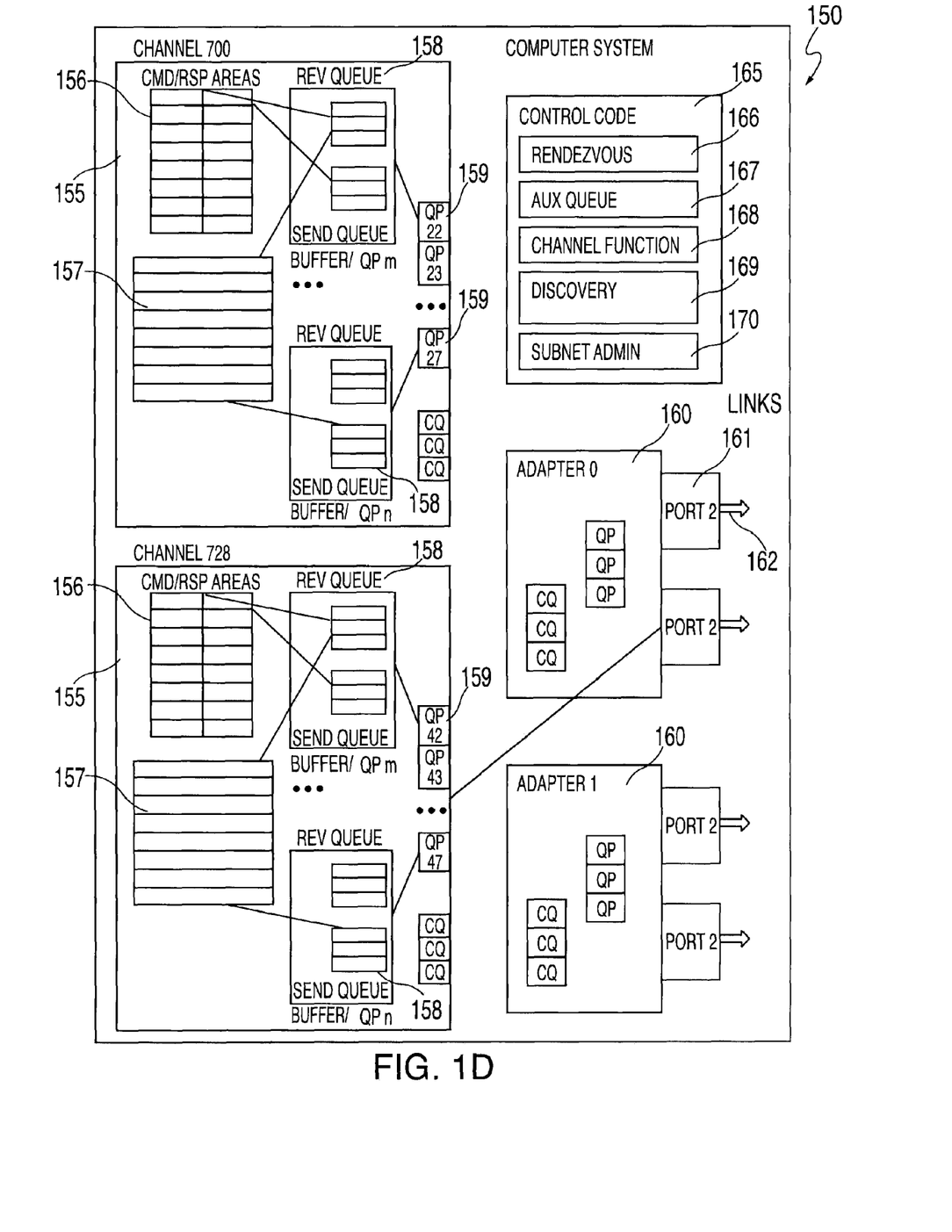
FIG. 1D illustrates a multitasking multiprocessor environment, according to an example embodiment.

FIG. 1A illustrates an exemplary embodiment of a multitasking multiprocessor Infiniband system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 is supported by Infiniband. FIG. 1B illustrates an example of a multitasking multiprocessor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multitasking multiprocessor environment in accordance with an exemplary embodiment. In this example, multiple internal channels 121, 122, 123 share the same physical connection 125. FIG. 1D illustrates an example of a multitasking multiprocessor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, for example, as supported by IBA. The channels 155 can further include queue pairs 159. The system 150 can further include control code 165 having functions including but not limited to: rendezvous 166, auxiliary queue 167, channel 168, discovery 169 and subnet administrator 170.

The use of state machines to describe the operations of the components (e.g., coupling buffers, etc) may be useful in that state machines allow for an easier, more visual understanding of the operation of the components, and for relatively easier determination of the state of processing of the components if a cancel request or other request is issued. If existing software provides functionality based on flags or logical identifiers to provide for status of components, the existing flags may be used to translate existing code portions into more complex operations based on the newer technology. For example, many existing algorithms may be abstracted such that underlying structure is not considered. More clearly, if the existing code uses flags in data structures, these flags may be used to interpret a state of processing (i.e., current state of a state machine). Thus, newer code portions may be implemented with the existing code to provide new functionality while retaining existing code or reducing changes to existing code.

Figure 2:
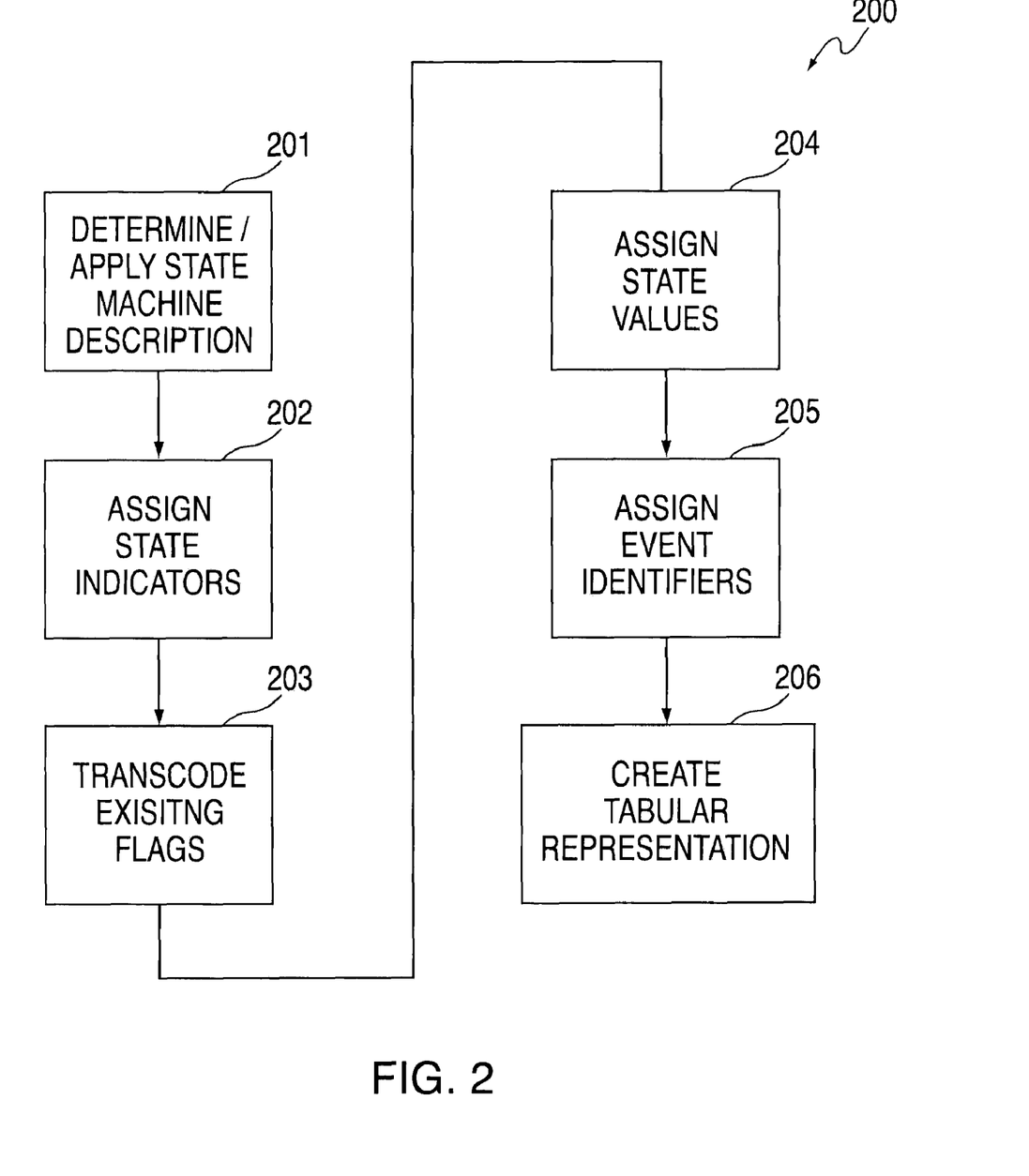
FIG. 2 illustrates a method for incorporating state machine controls into existing non-state machine environments, according to an example embodiment.

FIG. 2 illustrates a method 200 for incorporating state machine controls into existing non-state machine environments, according to an example embodiment. The method 200 includes determining or applying a state machine description to a computing environment at block 201. For example, the computing environment may be a multitasking multiprocessor environment as described with reference to FIG. 1. Upon determining desired operation for the environment, a state machine may be used to describe said operation.

The method 200 further includes assigning state indicators to the state machine at block 202. The state indicators may roughly indicate a current state, and thus, may overlap or repeat depending upon any particular implementation. It is noted that repeating state indicators are typically problematic as a definite state may not be identifiable, however, when using additional indication identifiers, such as flags of existing code, state differentiation is more feasible, as continued below.

The method 200 further includes transcoding existing flags at block 203. For example, a plurality of logical flags may be included in existing code. Each flag may represent a status of a particular portion of the environment, or code portions being executed. For example, existing flags may include buffer states, received requests, message status, etc. Thus, utilizing a combination of the existing states with the state indicators provides a more definite state identification. As such, existing flags are transcoded into separate values.

The method 200 further includes assigning state values at block 204. For example, if the existing flags have been transcoded into separate values and organized, the combination of the transcoded flags and the state indicators may be used to assign specific state values. More clearly, the combination of state indicators (which may be duplicated across some actual states) may be combined with existing flags (which may not repeat exactly for any state with a repeating state indicator) to produce specific state values for the state machine. Thus, an accurate state machine representation may be provided according to the methodologies described thus far. However, identification of a current state alone does not facilitate state machines completely, thus the method 200 further includes creating a tabular representation of state machine transitions. For example, the method 200 includes assigning event identifiers at block 205. The event identifiers may identify events which may trigger a change in state of the state machine. For example, errors, received messages, and other suitable events may trigger a change in state. Each particular event may be assigned a unique number for indexing purposes. Thereafter, a tabular format for state machine operation may be created (see block 206).

For example, a table including particular state values for indexing a plurality of possible next states may be created. Each of the possible next states may be individually indexed based on the event identifiers. In this manner, a current state and an event identifier may be used to traverse a state machine using existing code. Hereinafter, an example state machine implementation is described with reference to FIGS. 3-4. It is noted that the example state machine is provided for illustrative purposes only, as there are exceedingly large numbers of unique state machines that may be used for any particular environment.

Figures 3, 3A:
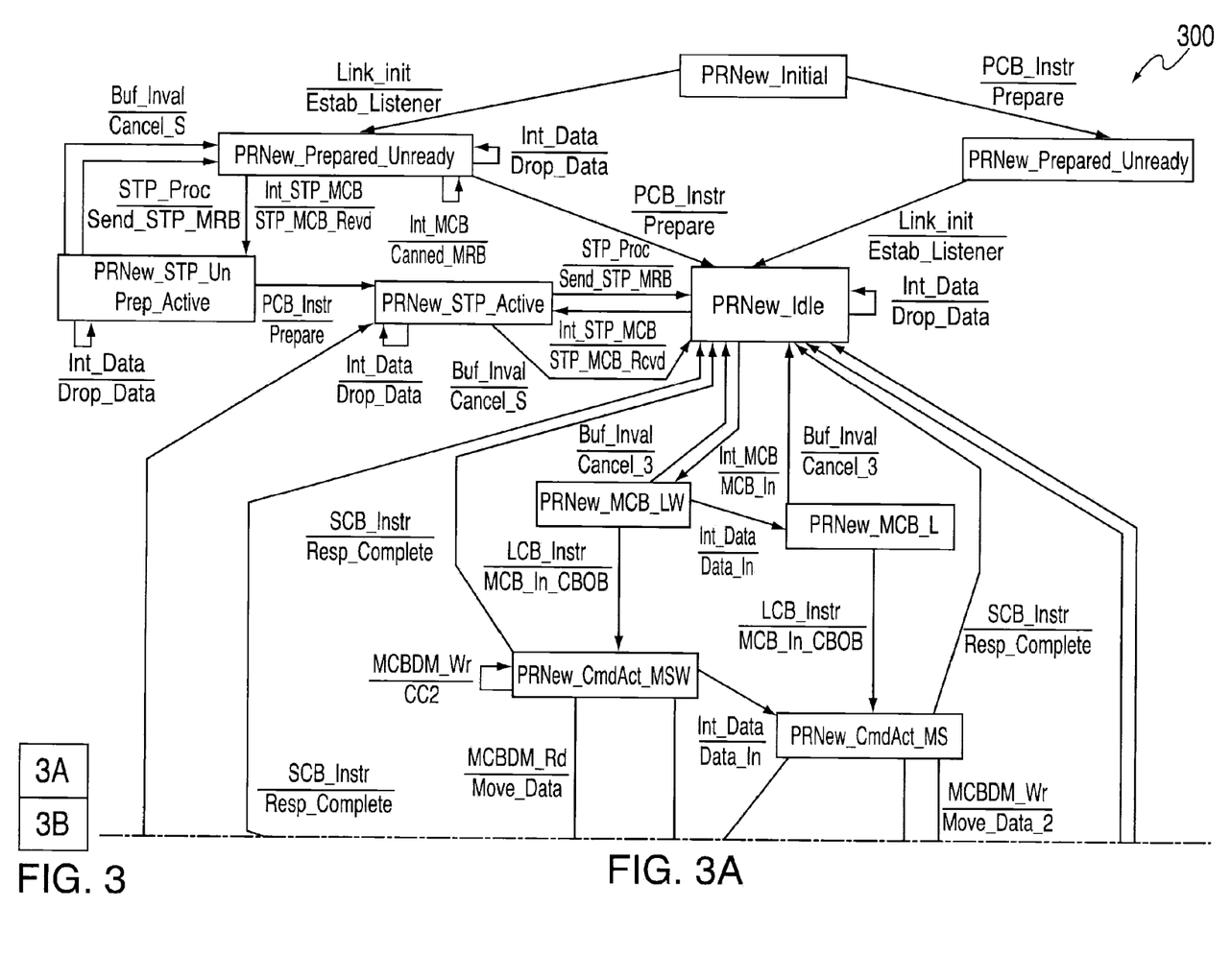
FIG. 3 illustrates an example state machine.
Figure 3B:
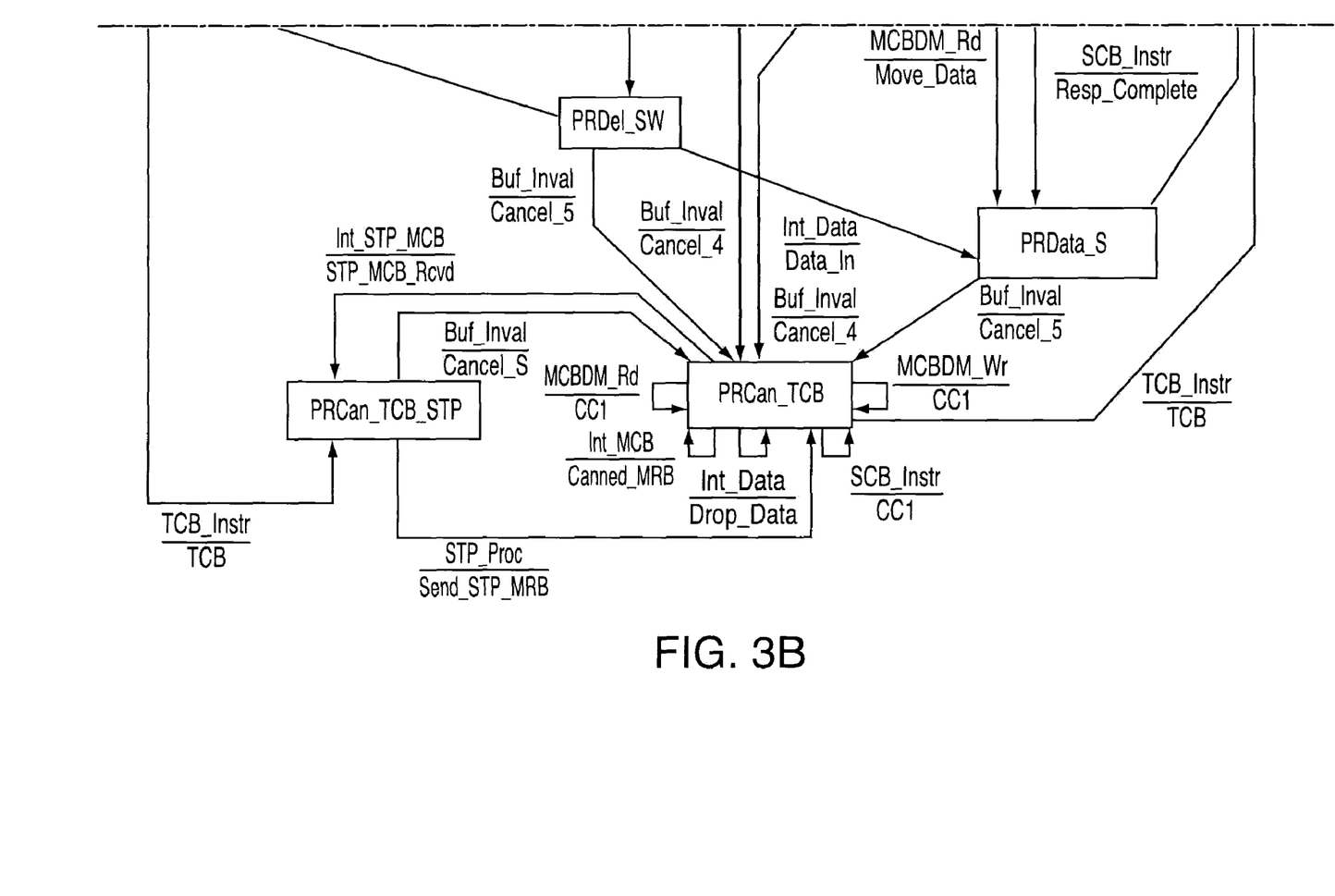

FIG. 3 illustrates an example state machine 300. As illustrated, the state machine 300 includes a plurality of states (denoted by rectangular boxes), with each state including at least one event to trigger a change in state (denoted by arguments on connections). According to the methodologies described hereinbefore, state indicators may be assigned for each state of the state machine 300. Table 1 below sets forth example state indicators for the example state machine 300:

TABLE 1

| State Indicator | State Name |
| --- | --- |
| 0x50 | PRNew__Initial |
| 0x50 | PRNew__Prepared__Unready |
| 0x51 | PRNew__UnPrepared__Ready |
| 0x51 | PRNew__Idle |
| 0x51 | PRCan__TCB |
| 0x53 | PRNew__MCB__LW |
| 0x53 | PRNew__CmdAct__MSW |
| 0x54 | PRNew__MCB__L |
| 0x54 | PRNew__CmdAct__MS |
| 0x56 | PRData__S |
| 0x58 | PRDel__SW |
| 0x5F | PRNew__STP__UnPrep__Active |
| 0x5F | PRNew__STP__Active |
| 0x5F | PRCan__TCB__STP |

Figure 4:
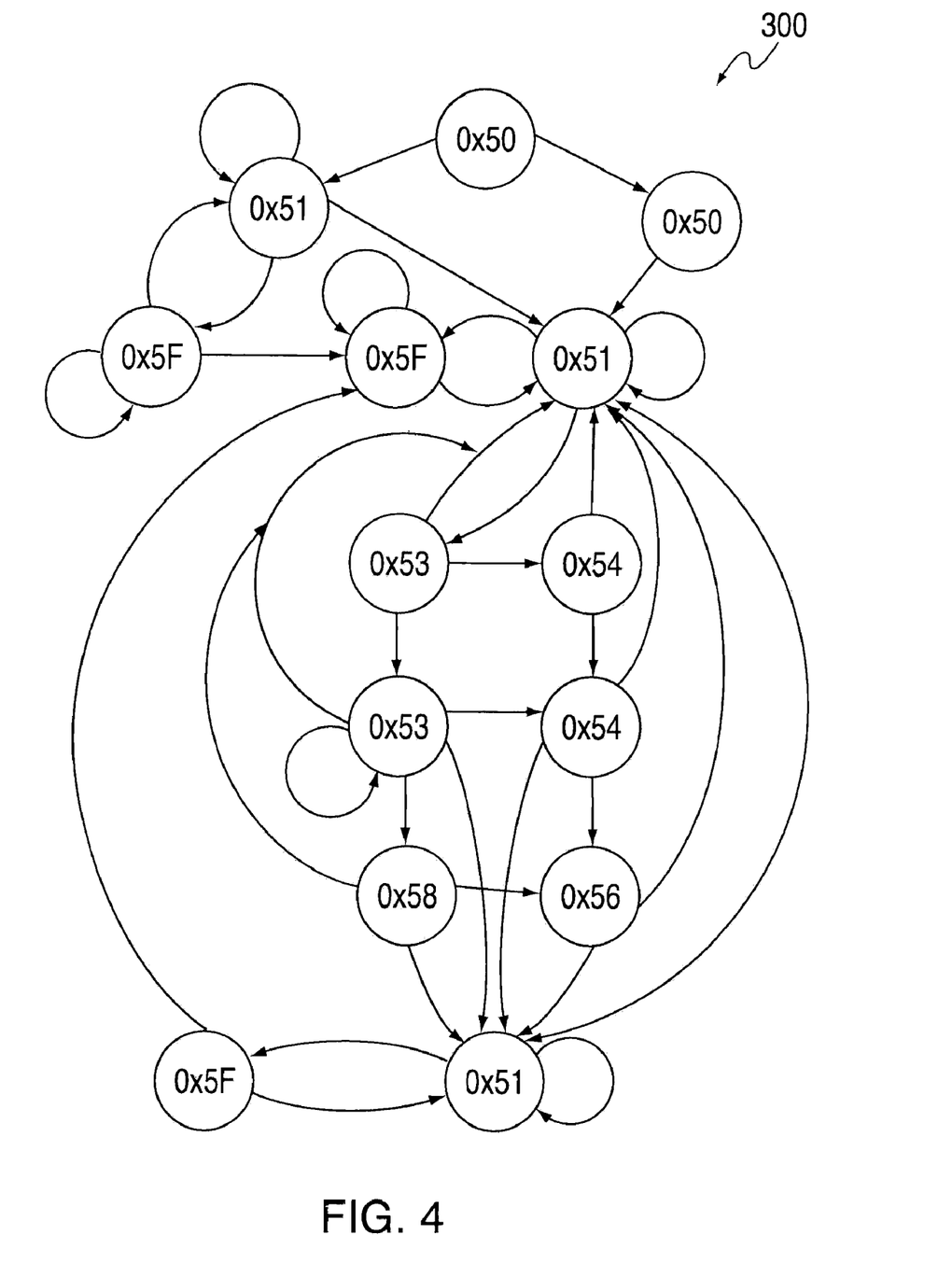
FIG. 4 illustrates an example state machine.

As depicted in Table 1, several of the state indicators overlap. Typically, this would be confusing if state indicators were the only metric of state translation. For example, FIG. 4 illustrates an example state machine 300, with each state being represented only by the state indicators of Table 1. As illustrated, it is difficult to differentiate based solely on state indicators. However, according to the example methodologies provided above, existing flags may be transcoded into modifiers to provide more accurate depiction of individual states. For example, Table 2 below provides an example listing of existing flags of an example system and associated modifiers:

TABLE 2

| Modifier Value | Modifier Explanation |
| --- | --- |
| 0 | No modifier is to be applied for this bit |
| 1 | Unprepared buffer (0 = Buffer is prepared for use, 1 = Buffer is not prepared for use) |
| 2 | Command Active (0 = Not active/no command has arrived, 1 = Active/command has arrived to be processed) |
| 3 | Status Pending (0 = No status is pending, 1 = Status is pending) |
| 4 | MRB Rcvd (0 = MRB not yet received for this message, 1 = MRB has been received for this message) |
| 5 | Cancel Request (0 = Cancel has not been requested, 1 = Cancel has been requested) |
| 6 | Message Sent (0 = No message has been sent since the bit was last cleared, 1 = Message has been sent since the bit was last cleared. |
| 7 | Message Received (0 = No message has been received since the bit was last cleared, 1 = Message has been received since the bit was last cleared.) |

As set forth above in Table 2, a modifier value is assigned for each flag of the existing software. The existing flags are described in the second column of Table 2. The modifier values may then be used to produce the state values for the state machine 300. For example, the current state indicator, and each modifier value, may be combined to produce individual state values for the state machine.

Each state indicator has a modifier mask associated with it to describe what modifiers are to be used for differentiating the states which share a given state indicator. These modifier masks may be grouped with other modifier masks and organized into a table for indexing. Table 3 below provides an example Modifier mask table:

TABLE 3

| Mask Entry 0 | Mask Entry 1 | Mask Entry 2 | Mask Entry 3 |
| --- | --- | --- | --- |
| Mask Entry 4 | Mask Entry 5 | Mask Entry 6 | Mask Entry 7 |
| ... | ... | ... | ... |

Each mask entry as provided in Table 3 may include a group of modifiers as provided below in Table 4:

TABLE 4

| Modifier 1 | Modifier 2 |
| --- | --- |

It is noted that more modifiers than the two illustrated in FIG. 4 may be used depending upon the actual state machine design. For example, relatively simple state machines with few states may require more or less modifiers depending upon the repetitiveness of the state indicator values. When identifying the current state, the code obtains the current state indicator, uses that value to index into the modifier mask table, evaluates the values associated with the modifiers identified, and may insert these values appended to the state indicator value, in order to create the state value. In a simple example, as illustrated by the above Table 2, the values associated with the modifiers translate to one bit for each modifier. The order in which those bits are appended is dictated by the order in the modifier mask.

Upon assigning state values, event identifiers may be assigned. Table 5 below illustrates an example table of event identifiers for state machine 300:

TABLE 5

| | |
|---|---|
| Error | This is an erroneous event. (Event ID = 0) |
| Link_Init | The IB Link is being established for this QP. (Event ID = 1) |
| Destroy_QP | This specific QP is being brought down for recovery (Event ID = 2) |
| QP_Error | A QP error has occurred, so driving a recovery action. (Event ID = 3) |
| QP_Disc | The QP has disconnected. (Event ID = 4) |

Thereafter, using the current state information, the event identifiers, and the state machine representation, a tabular representation for the state machine may be created. For example, Table 6 below provides an example State Machine Table depicting the Next State using the current state value and event identifiers as indices:

TABLE 6

| | Event 0 | Event 1 | Event 2 | ... |
|---|---|---|---|---|
| State 0 | Next state | Next state | Next state | |
| State 1 | Next state | Next state | Next state | |
| State 2 | Next state | Next state | Next state | |
| State 3 | Next state | Next state | Next state | |
| ... | | | | |

It is noted that upon creation of the Next State Table, for example as depicted in Table 6, state machine controls may be implemented in the non-state machine environment such that current and next state information is provided. Furthermore, it is noted that if the combined state and event are undefined or unexpected, then the Next State may be set to either remain in the current state or invoke an error condition depending upon the nature of the implementation.

Figure 5:
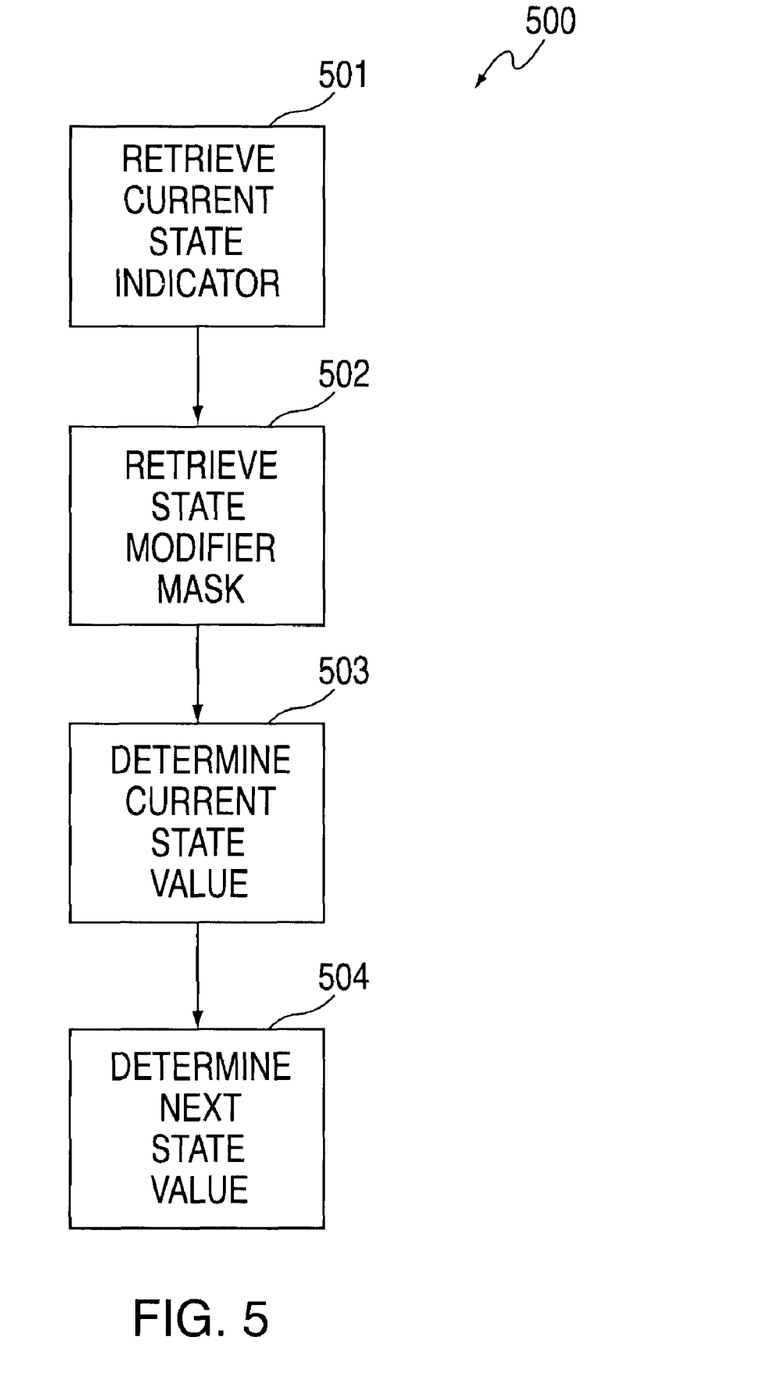
FIG. 5 illustrates a method for incorporating state machine controls into existing non-state machine environments, according to an example embodiment.

For example, FIG. 5 illustrates a method 500 for incorporating state machine controls into existing non-state machine environments, according to an example embodiment. The method 500 includes retrieving a current state indicator at block 501. The method 500 further includes retrieving a state modifier mask at block 502. Thereafter, the method 500 includes determining a current state value at block 503. Note that block 503 includes evaluating the values associated with the identified modifiers and placing those values together with the current state indicator. Then determining the next state value at block 504.

Therefore, according to example embodiments, methodologies are provided which allow incorporation of state machine controls in existing non-state machine control environments. Through the use of existing logical flags of the existing code, impact to existing code is reduced or minimized, allowing for faster implementation of newer features with the stability of state machine controls. It is noted that although particular descriptions of example flags, particular table sizes, particular numbers of components, and other narrow examples are given above, these examples are intended to be illustrative only. Therefore, example embodiments should not be limited to only those particular features described herein.

Figure 6:
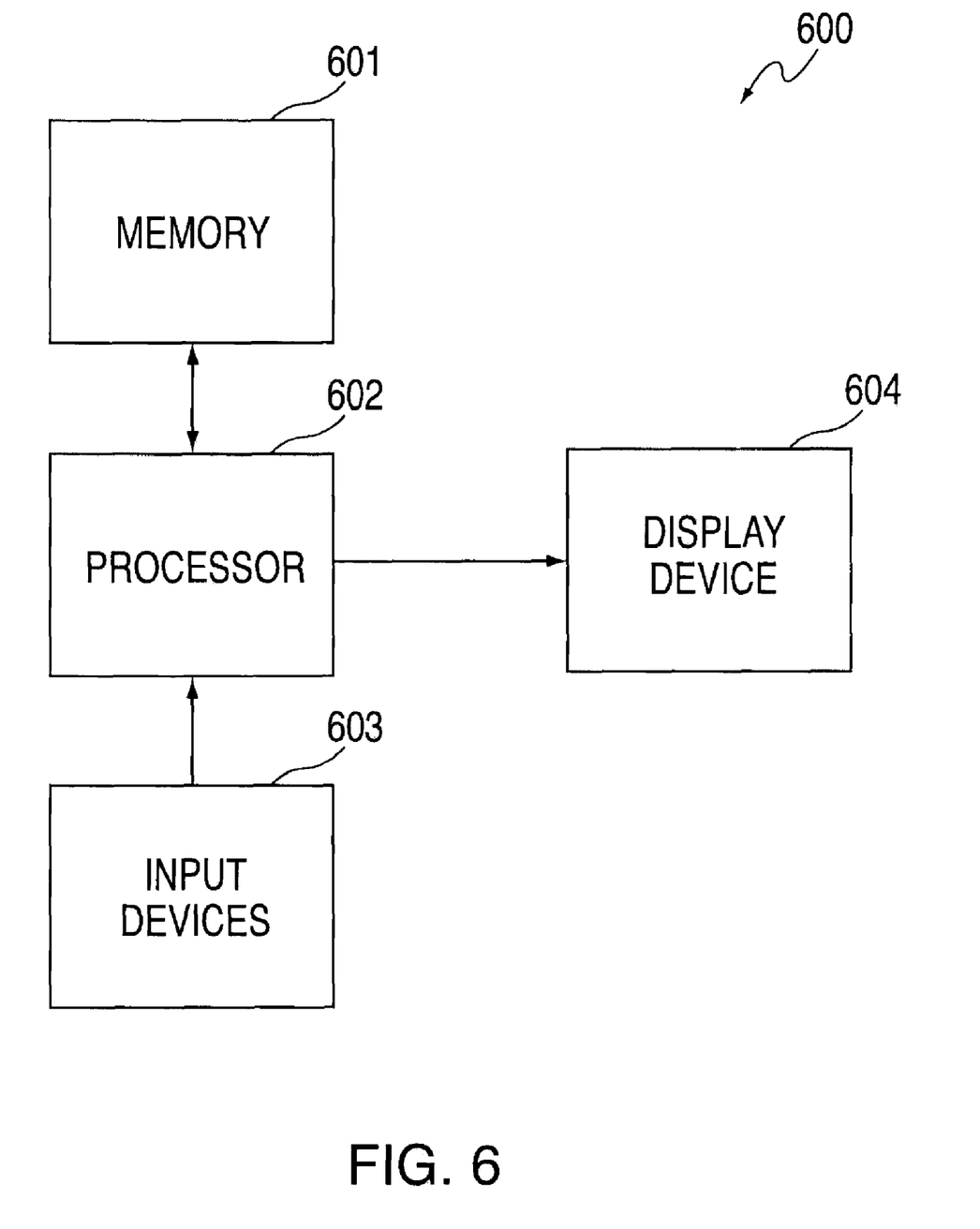
FIG. 6 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 6 illustrates a computer apparatus, according to an exemplary embodiment. Therefore, portions or the entirety of the methodologies described herein may be executed as instructions in a processor 602 of the computer system 600. The computer system 600 includes memory 601 for storage of instructions and information, input device(s) 603 for computer communication, and display device 604. Thus, the present invention may be implemented, in software, for example, as any suitable computer program on a computer system somewhat similar to computer system 600. For example, a program in accordance with the present invention may be a computer program product causing a computer to execute the example methods described herein.

The computer program product may include a computer-readable medium having computer program logic or code portions embodied thereon for enabling a processor (e.g., 602) of a computer apparatus (e.g., 600) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A computer program product for incorporating state machine controls into existing computing environments, the computer program product comprising:
   a tangible storage medium readable by a processing circuit and storing instructions for execution by the processing circuit for performing a method comprising:

determining a state machine representation for an existing computing environment;

assigning state indicators to each state of the state machine;

transcoding existing software flags of the computing environment into modifier values associated with the state indicators;

assigning state values based on the modifier values and the state indicators;

assigning event identifiers for transitions from the state values; and creating a tabular representation of the determined state machine, the tabular representation providing next state information based on the event identifiers and the state values.

2. The computer program product of claim 1, wherein the method further comprises:

retrieving a state indicator and state modifier mask;

determining a state value based on the state indicator and state modifier mask; and determining a next state value based on the current state value and an event.

3. The computer program product of claim 2, wherein the state modifier mask includes modifier values.

4. The computer program product of claim 2, wherein determining the state value includes combining the state indicator and the modifier mask.

5. The computer program product of claim 2, wherein determining the next state value includes indexing a value from the tabular representation using the state value and the event.

6. The computer program product of claim 1, wherein transcoding existing software flags includes assigning modifier values to each existing software flag and organizing the modifier values.

7. The computer program product of claim 6, wherein assigning state values includes combining the modifier values and state indicators.

8. The computer program product of claim 1, wherein assigning state values includes combining the modifier values and state indicators.

9. A multitasking multiprocessor computing environment, the computing environment comprising:

a plurality of processors configured to execute portions of existing software and a method of incorporating state machine control into the existing software, the method comprising:

determining a state machine representation for the computing environment;

assigning state indicators to each state of the state machine;

transcoding existing software flags of the computing environment into modifier values associated with the state indicators;

assigning state values based on the modifier values and the state indicators;

assigning event identifiers for transitions from the state values; and creating a tabular representation of the determined state machine, the tabular representation providing next state information based on the event identifiers and the state values.

10. A method for incorporating state machine controls into existing computing environments, the method comprising:

determining a state machine representation for an existing computing environment;

assigning state indicators to each state of the state machine;

transcoding existing software flags of the computing environment into modifier values for the state indicators;

assigning state values based on the modifier values and the state indicators;

assigning event identifiers for transitions from the state values; and creating a tabular representation of the determined state machine, the tabular representation providing next state information based on the event identifiers and the state values.

11. The method of claim 10, further comprising:

retrieving a state indicator and state modifier mask;

determining a state value based on the state indicator and state modifier mask; and determining a next state value based on the current state value and an event.

12. The method of claim 11, wherein the state modifier mask includes modifier values.

13. The method of claim 11, wherein determining the state value includes combining the state indicator and the modifier mask.

14. The method of claim 11, wherein determining the next state value includes indexing a value from the tabular representation using the state value and the event.

15. The method of claim 10, wherein transcoding existing software flags includes assigning modifier values to each existing software flag and organizing the modifier values.

16. The method of claim 15, wherein assigning state values includes combining the modifier values and state indicators.

17. The method of claim 10, wherein assigning state values includes combining the modifier values and state indicators.

* * * * *